April 15, 1930.  H. C. GEORGI  1,754,676
FRICTION BLOCK FOR BRAKES, FRICTION CLUTCHES, AND THE LIKE
Filed May 11, 1929
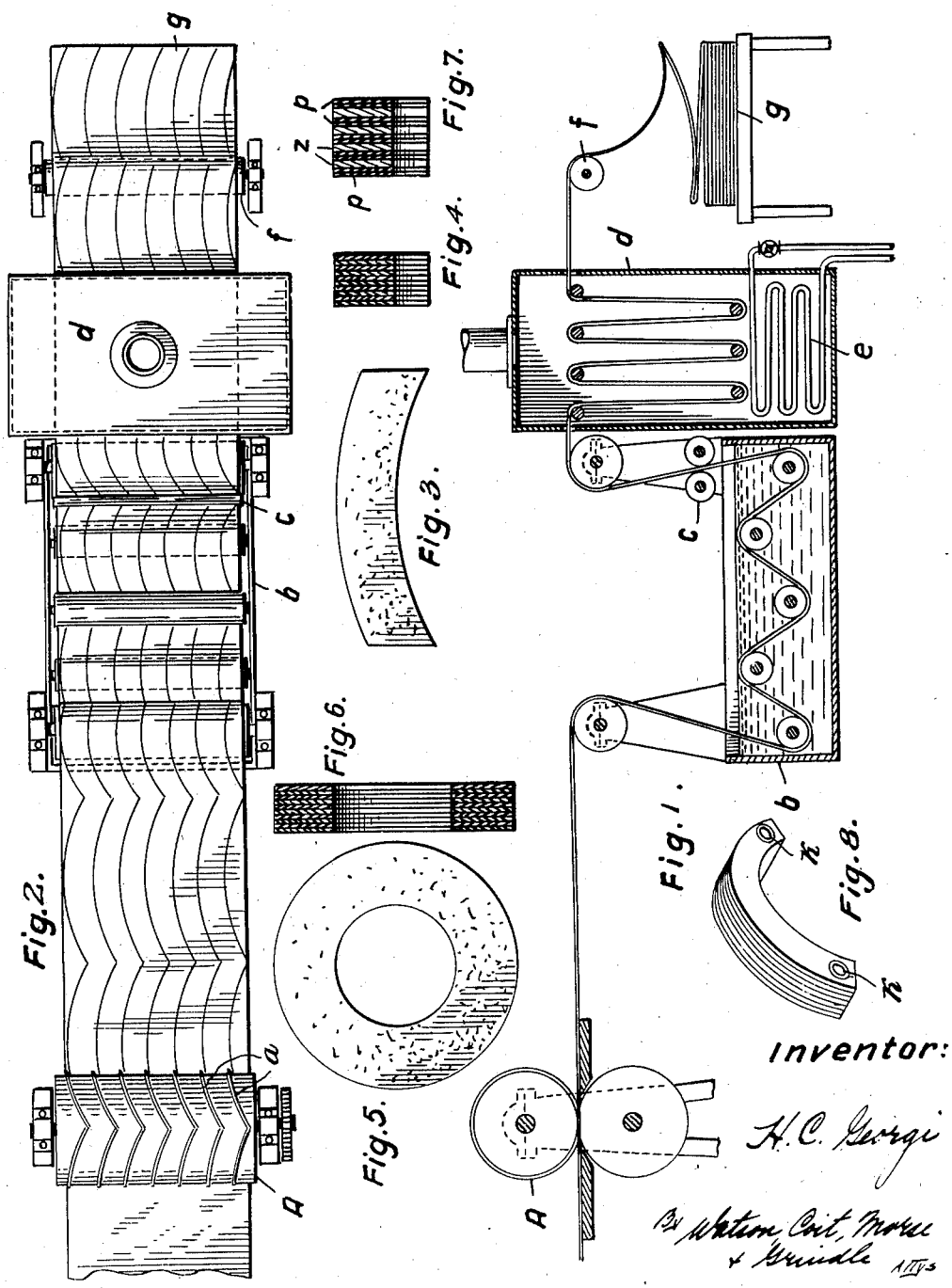

Patented Apr. 15, 1930

1,754,676

UNITED STATES PATENT OFFICE

HEINRICH CONSTANTIN GEORGI, OF BERLIN-ZEHLENDORF-WEST, GERMANY, ASSIGNOR TO DEUTSCHE ASBESTWERKE A.-G., OF BERLIN-ZEHLENDORF, GERMANY, A JOINT-STOCK COMPANY

FRICTION BLOCK FOR BRAKES, FRICTION CLUTCHES, AND THE LIKE

Application filed May 11, 1929, Serial No. 362,312, and in Germany December 12, 1927.

My invention relates to improvements in friction blocks for brakes, friction clutches, and the like, and more particularly in blocks composed of asbestos paper or asbestos pasteboard. As now manufactured such friction blocks consist of a suitable number of superposed layers connected with each other by mechanical means, such as bolts, clamps and the like, or by gluing. The object of the improvements is to provide a block of this type in which the superposed layers are combined into a coherent body by transverse pressure, and in which therefore mechanical means for holding the layers together are dispensed with, the friction block consisting of a compact mass having no individual layers.

A further object of the invention is to provide an integral brake shoe of material having a high coefficient of friction, and preferably fibrous material in the nature of asbestos, which may be inserted as a unit into the usual brake organization. The conventional brake shoe is provided with a facing or lining of friction material which is secured to the shoe by means of rivets or bolts, the body of the shoe being ordinarily formed of metal. Owing to the fact that the linings are somewhat thin, they are required to be renewed frequently and such renewal requires the services of an expert in order that the lining may be securely riveted to the brake body in such a manner that the rivets will not contact with the cooperating friction element.

The present invention consists in providing a unitary brake shoe which is of fibrous material throughout and which will therefore wear considerably longer than the conventional lining, and which may be replaced by simply inserting the complete shoe in lieu of a worn out shoe without the services of a mechanic or without the use of rivets or bolts.

In the manufacture of the block I proceed from blanks having a surface area corresponding to the surface area of the block to be manufactured, and a suitable number of the said blanks is combined into a body. If desired, layers of fiber or metal fabric or sheet metal may be placed between the said layers of asbestos, which fabric is combined with the asbestos by high pressure into a coherent body.

For manufacturing the block I first cut strips of the form corresponding to the desired form of the block from asbestos paper. Preferably, the said strips are cut from the paper immediately after manufacturing the paper on the paper making machine.

For the purpose of explaining the invention several examples of blocks and apparatus for manufacturing the same have been shown in the accompanying drawing, in which, Figure 1 is a diagrammatical elevation, showing a machine for handling asbestos paper;

Figure 2 is a top plan view of Fig. 1, showing a sheet of asbestos paper cut in strips;

Figure 3 is a plan view, showing a block made from the strips shown in Fig. 2;

Figure 4 is a sectional elevation of the block shown in Fig. 3;

Figure 5 is a top plan view, showing a block of a modified form;

Figure 6 is a sectional elevation of the block shown in Fig. 5;

Figure 7 is a sectional elevation, showing a block of modified form; and

Figure 8 is a perspective view of a complete brake shoe constructed in accordance with the principles of the present invention.

Referring at first to Figs. 1 and 2, a sheet of asbestos paper is passed through rollers A provided with cutting blades $a$ for cutting the same into strips of the form shown in Fig. 2, which strips are passed through a receptacle $b$ containing a suitable impregnating medium, and thereafter through squeezing rollers $c$ and a drying chamber $d$ heated by a heating coil $e$. Within the said chamber $d$ the strips are subjected to preliminary drying, and if desired they are heated. Thereafter the strips are passed on guide rollers $f$ and to a folding apparatus (not shown) by means of which they are folded and assembled into piles having the desired number of layers of asbestos paper. In the example shown in Fig. 2 the blades $a$ cut the sheet into six strips, and accordingly six piles $g$ are deposited by the folding apparatus. The plan view of the individual piles corresponds to the finished block shown in Fig. 3. Fig. 4 shows the superposed layers of the block.

When making the layers from asbestos pasteboard, the segments and layers are individually cut from the pasteboard by punching, and they are placed one above the other for being compressed. The superposed and impregnated layers of paper or pasteboard are now pressed in a matrix having a form corresponding to the segmental form of the blanks, preferably by means of a hydraulic press adapted to exert very high pressure. Now the impregnated and compressed blocks are heated and hardened, whereupon the blocks have the form shown in Fig. 3 and 4. Where the blocks are made from blanks which are not impregnated the sheet of paper is not passed through the receptacle $b$ and the drying chamber $d$. But in this case it is necessary to compress the piles of blanks by very high pressure of at least 600 atmospheres.

By means of the method described above, brake blocks or the like of any desired size and shape can be manufactured.

The blocks made by my improved method may be used as brake blocks, as friction members for friction clutches, and the like. In Figs. 5 and 6 I have shown a modification of a brake block which is annular in form, the said block being composed of annular blanks of asbestos paper or pasteboard impregnated by a suitable impregnating medium, the number of the superposed blanks corresponding to the desired thickness of the block. The superposed annular blanks are compressed by very high pressure and hardened. When using the said annular block it is placed with its surface parallel on the cooperating friction member.

In Fig. 7 I have shown a modification in which layers of a suitable fabric made from fibrous material or metal are placed between the blanks, the result being a brake block or the like capable of particularly high strain. In Fig. 7 the layers of asbestos paper have received the character $p$, and the layers of fabric have received the character $z$. For the purpose of illustration the layers have been shown thicker than they actually are.

Instead of manufacturing the blocks from paper or pasteboard I may manufacture the same from asbestos fabric, the said fabric being cut into blanks of the desired form and further treated in the manner described above.

Fig. 8 illustrates a complete brake shoe constituting an integral unit of compressed fibrous material. This shoe may be formed in the manner illustrated in Figs. 1 and 2 by cutting a fibrous sheet longitudinally into a series of strips and folding the consecutive sections of each strip back and forth to build up a laminated element. It will be understood that the operation of forming the apertures $k$ in such a shoe may be accomplished during the cutting operation, although the precise means for forming these apertures constitutes no part of the present invention and has not been illustrated in the drawings. Preferably a bushing or eyelet is inserted through the apertures subsequent to the folding operation.

The layers are then compressed in the manner described above, and if a binder is used, heat is simultaneously applied to the laminated element to consolidate the binder.

It will be appreciated that this shoe may assume various forms, depending on the precise construction of the brake organization with which it is to be used, the fibrous shoe being complete in itself as distinguished from a lining block or facing for application to the conventional metal shoe body. A shoe of this type may be readily substituted in the brake organization when replacement is required, and eliminates the necessity for riveting or other operations which can ordinarily be performed only by the skilled mechanic and by the use of special tools.

Having thus described the invention, what is claimed as new and desired to be secured by Letters Patent is:

1. The herein described method of manufacturing friction blocks for brakes, friction clutches, and the like, which consists in cutting a sheet of fibrous material longitudinally into elongated strips each consisting of a series of coherent blanks of the desired form of the block, folding the said strips into piles of superposed blanks, and compressing the piles into a coherent block.

2. The herein described method of manufacturing friction blocks for brakes, friction clutches, and the like, which consists in cutting a sheet of asbestos paper longitudinally into elongated strips each consisting of a series of coherent blanks of the desired form of the block, impregnating the said strips, folding the said strips into piles of superposed blanks, and compressing the piles into a coherent block.

3. A method of making an integral friction element having a curved active engaging friction surface thereon which comprises slitting a continuous sheet of flexible material longitudinally to form a plurality of contiguous endless strips, the edges of each strip comprising a series of individual arcs having a length and radius substantially equal to that of the finished element, folding each strip back and forth so that the successive arcuate edges thereof are superposed until the desired thickness is obtained, and compressing the folded strips to form the coherent element.

In testimony whereof I hereunto affix my signature.

HEINRICH CONSTANTIN GEORGI.